US010120908B2

(12) United States Patent
Allen et al.

(10) Patent No.: US 10,120,908 B2
(45) Date of Patent: *Nov. 6, 2018

(54) RECOMMENDATION ENGINE USING INFERRED DEEP SIMILARITIES FOR WORKS OF LITERATURE

(71) Applicant: International Business Machines Corporation, Armonk, NY (US)

(72) Inventors: Corville O. Allen, Durham, NC (US); Scott R. Carrier, Durham, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 59 days.

This patent is subject to a terminal disclaimer.

(21) Appl. No.: 15/149,023

(22) Filed: May 6, 2016

(65) Prior Publication Data
US 2016/0253413 A1   Sep. 1, 2016

Related U.S. Application Data

(63) Continuation of application No. 14/491,052, filed on Sep. 19, 2014, now Pat. No. 9,613,098, which is a
(Continued)

(51) Int. Cl.
G06F 17/30   (2006.01)

(52) U.S. Cl.
CPC .. *G06F 17/30522* (2013.01); *G06F 17/30011* (2013.01); *G06F 17/3053* (2013.01);
(Continued)

(58) Field of Classification Search
CPC combination set(s) only.
See application file for complete search history.

(56) References Cited

U.S. PATENT DOCUMENTS 6,289,342 B1 *   9/2001   Lawrence ......... G06F 17/30728
6,580,437 B1     6/2003   Liou et al.
(Continued)

FOREIGN PATENT DOCUMENTS

WO   WO2009021198   12/2009

OTHER PUBLICATIONS

USPTO; Notice of Allowance dated Nov. 17, 2016 in pending U.S. Appl. No. 14/491,052, filed Sep. 19, 2014.
(Continued)

*Primary Examiner* — Shyue Jiunn Hwa
(74) *Attorney, Agent, or Firm* — Robert H. Frantz; Reza Sarbakhsh

(57) ABSTRACT

A recommendation engine for works of literature uses patterns of flow and element similarities for scoring a first user-rated work of literature against one or more recommendation candidate works of literature. Cluster models are created using meta-data modeling the works of literature, the meta-data having literary element categories and instances within each category. Each instance is described by an index value (position in the literature) and significance value (e.g. weight or significance). Cluster finding process(es) invoked for each instance in each category find Similarity Concept clusters and Consistency Trend clusters, which are recorded into the cluster models representing each work of literature. The cluster model can be printed or displayed so that a user can visually understand the ebb and flow of each literary element in the literature, and may be digitally compared to other cluster models of other works of literature for potential recommendation to a user.

18 Claims, 8 Drawing Sheets
(1 of 8 Drawing Sheet(s) Filed in Color)

Related U.S. Application Data continuation of application No. 14/094,934, filed on Dec. 3, 2013, now Pat. No. 9,298,802.

(52) U.S. Cl.
CPC .. *G06F 17/30598* (2013.01); *G06F 17/30616* (2013.01); *G06F 17/30684* (2013.01); *G06F 17/30699* (2013.01); *G06F 17/30705* (2013.01); *G06F 17/30722* (2013.01)

(56) References Cited

U.S. PATENT DOCUMENTS

| | | | |
|---|---|---|---|
| 7,058,567 B2 | 6/2006 | Ait-Mokhtar | |
| 7,115,297 B2 | 10/2006 | Stillman | |
| 7,788,084 B2 | 8/2010 | Brun et al. | |
| 9,298,802 B2 | 3/2016 | Allen et al. | |
| 2002/0026459 A1 | 2/2002 | Fernandez | |
| 2002/0103799 A1* | 8/2002 | Bradford | G06F 17/30687 |
| 2002/0184188 A1 | 12/2002 | Mandyam et al. | |
| 2003/0225773 A1 | 12/2003 | Jenssen | |
| 2004/0249791 A1* | 12/2004 | Waters | G06F 19/28 |
| 2005/0114399 A1 | 5/2005 | Hosoi | |
| 2005/0120015 A1* | 6/2005 | Marum Campos | G06N 99/005 |
| 2005/0165600 A1 | 7/2005 | Kasravi et al. | |
| 2006/0122807 A1* | 6/2006 | Wittkowski | G06F 17/18 702/179 |
| 2006/0242180 A1 | 10/2006 | Graf et al. | |
| 2007/0208545 A1 | 9/2007 | Wittkowski | |
| 2007/0214100 A1 | 9/2007 | Marfatia et al. | |
| 2008/0235576 A1 | 9/2008 | Bringsjord et al. | |
| 2008/0256066 A1 | 10/2008 | Zuckerman et al. | |
| 2009/0248399 A1 | 10/2009 | Au | |
| 2010/0100826 A1 | 4/2010 | Hawthorne et al. | |
| 2010/0169803 A1 | 7/2010 | Mazzei et al. | |
| 2010/0235165 A1 | 9/2010 | Todhunter et al. | |
| 2011/0270607 A1 | 11/2011 | Zuev | |
| 2012/0245923 A1 | 9/2012 | Brun | |
| 2012/0254333 A1* | 10/2012 | Chandramouli | G06F 17/27 709/206 |
| 2013/0096909 A1 | 4/2013 | Brun | |
| 2013/0218914 A1 | 8/2013 | Stavrianou | |
| 2014/0079297 A1* | 3/2014 | Tadayon | G06K 9/00 382/118 |
| 2015/0154246 A1 | 6/2015 | Allen et al. | |
| 2015/0154278 A1 | 6/2015 | Allen et al. | |

OTHER PUBLICATIONS

USPTO; first Office Action dated Jul. 12, 2016 in pending U.S. Appl. No. 14/491,052.
IBM; response to first Office Action, filed on Oct. 12, 2016, in pending U.S. Appl. No. 14/491,052.
Allen, James F., et al., "Deep Semantic Analysis of Text", retrieved on Oct. 27, 2012 from http://aclweb.org/anthology-view/W/W08/W08-2227.pdf.
Wikipedia; "Smith-Waterman algorithm"; retrieved from http://en.wikipedia.org/wiki/Smith-Waterman_algorithm on Feb. 5, 2013.
Meeson, R. N. Jr., et al; ip.com; "An Evaluation of Data Abstraction for Software Modification"; document No. IPCOM000151064D, published on May 31, 1980; retrieved from www.IP.com.
Guarino, L.R., et al; "The Evolution of Abstraction in Programming Languages"; document No. IPCOM000148048D, published on May 22, 1978; retrieved from www.IP.com.
McCarty, L. Thorne, "Deep Semantic Interpretations of Legal Texts",retrieved on Nov. 27, 2012 from http://remus.rutgers.edu/cs440/icail07-acm.pdf.
Brave/FPL;"International Application Published Under the Patent Cooperation Treaty"; Publication No. WO 2009/021198.
Linkspringer; "Linguistic and Semantic Representation of the Thompson's Motif-Index and Folk-Literature"; Retrieved on Aug. 28, 2013 from http://link.springer.com/chapter/10.1007/978-3-642-24469-8_17.
Ait-Mokhtar; "Robustness beyond Shallowness:Incremental Deep Parsing"; Retrieved on Aug. 28, 2013 from http://pageperso.lif.univ-mrs.fr/~edouard.thiel/RESP/Semi/2006/ROUX/idp.pdf.
Wikipedia; "Cluster Analysis";Retrieved on May 15, 2013 from http://en.wikipedia.org/wiki/Cluster_analysis.
Maggiani, R.; "Method for Customizing Queries Based on User Preferences for Searching Online Content and Returning Customized Results"; published by IP.com, Feb. 10, 2009.
Anonymous; "Method and Apparatus for User Authentication Based on Dynamic Question-Answer Generation from Social Networks Data"; published by IP.com, Mar. 19, 2012.
Ferrucci, D.; "Building Watson; An Overview of the DeepQA Project"; retrieved on Nov. 11, 2011 from http://www.stanford.edu/class/cs124/AIMagzine-DeepQA.pdf.
IBM; "High Throughput Computing on IBM's Blue Gene/P".
IBM; "IBM System Blue Gene/P Solution".
IBM Research; "DeepQA Project FAQ's"; retrieved on Sep. 13, 2011 from http://www.researchibm.com/deepqa/faq.shtml.
IBM Research; "Unstructured Information Management Architecture (UIMA)"; retrieved on Oct. 19, 2011 from http://domino.research.ibm.com.
NTC's Dictionary of Literary Terms;"To the User" section; McGraw-Hill publishers, 1998.
USPTO; first office action dated Aug. 25, 2015 in related U.S. Appl. No. 14/094,934, filed Dec. 3, 2013 by Corville O. Allen, et al.
IBM; reply (dated Nov. 23, 2015) to first office action (dated Aug. 25, 2015) in related U.S. Appl. No. 14/094,934, filed Dec. 3, 2013 by Corville O. Allen, et al.
USPTO; notice of allowance dated Dec. 17, 2015 in related U.S. Appl. No. 14/094,934, filed Dec. 3, 2013 by Corville O. Allen, et al.

\* cited by examiner

RECOMMENDATION ENGINE USING INFERRED DEEP SIMILARITIES FOR WORKS OF LITERATURE

This is a continuation application of U.S. patent application Ser. No. 14/491,052, filed on Sep. 19, 2014, by Corville O. Allen, et al., which is a continuation of U.S. patent application Ser. No. 14/094,934, filed on Dec. 3, 2013, by Corville O. Allen, et al.

INCORPORATION BY REFERENCE

U.S. patent application Ser. No. 13/722,017, filed on Feb. 20, 2013, by Corville O. Allen, et al., U.S. patent application Ser. No. 14/094,934, filed on Dec. 3, 2013, by Corville O. Allen, et al., and are hereby incorporated by reference in their entireties.

FIELD OF THE INVENTION

This invention relates generally to methods and processes for determining trends and similarities within a digital work of literature, and more particularly to such methods and processes which enable comparison of two or more works of literature for the purposes of recommending one or more works of literature based upon similarities and dissimilarities.

BACKGROUND OF INVENTION

Works of literature, such as novels, short stories, textbooks and even legal reference books, contain complex relationships between their elements such as the organization of information, the relationship between the characters presented in the literature, and a plot line within the work of literature.

For works which are more narrative in nature, such as novels and short stories, the plot is a story line which is populated not only with characters and their interactions, but also with information such as natural events, descriptions of scenery, as well as elements such as humor, mystery, suspense, drama, action, struggles, birth, death, betrayal, etc. For works which are more referential, such as textbooks and references books, there characters who are the contributing authors as well as cited authors, and the plot line corresponds to the organization or sequence of presentation of information. All of these types of works of literature can be viewed in segments, such as chapters, or even just in blocks of literature such as page ranges.

As a consumer, whether an avid novel reader or a professional or student using a reference book, one becomes aware of one's preferred content and presentation sequence. For this reason, there is a vast array of novel writing styles as well as reference book formats. One novel consumer may prefer mild humor strewn throughout a drama (e.g. "romantic comedy") that has at least a small resolution of conflict within each chapter, for example. Another novel consumer may prefer mystery and intrigue, organized initially as separate plotlines which become entangled with each other in the later segments.

For reference works, one consumer may prefer a sequentially-organized presentation of information which starts with an introduction to a subject (e.g. field of science, area of law, etc.), and presents deeper and more detailed information progressively in each chapter, wherein a final chapter is virtually cryptic except to experts in the field. Another consumer, however, may wish to have all information on an area within the subject (e.g. electrical conductivity within physics, tax law within law, etc.) entirely presented within a chapter including its elementary presentation and its deepest presentation.

SUMMARY OF THE INVENTION

Digital or digitized works of literatures are analyzed for patterns of flow and element similarities for characterizing the work of literature by receiving meta-data modeling the literature, wherein the meta-data has literary element categories and instances within each category. Each instance is described by an index value (position in the literature) and significance value (e.g. weight or significance). Cluster finding process(es) are invoked around each instance in each category to find Similarity Concept clusters and Consistency Trend clusters, which are recorded into a cluster model representing the work of literature. The cluster model can be printed or displayed so that a user can visually understand the ebb and flow of each literary element in the literature, and may be digitally compared to other cluster models of other works of literature for potential recommendation to a user. A recommendation engine can use the similarly clusters for two different works of literature to determine a degree of similarity for one or more literary elements, and to the extent a literary element is preferred by a particular user, the recommendation engine can recommend one or more of the literary works having a threshold degree of similarity.

BRIEF DESCRIPTION OF THE DRAWINGS

The figures presented herein, when considered in light of this description, form a complete disclosure of one or more embodiments of the invention, wherein like reference numbers in the figures represent similar or same elements or steps. The patent or application file contains at least one drawing executed in color. Copies of this patent or patent application publication with color drawing(s) will be provided by the Office upon request and payment of the necessary fee.

DETAILED DESCRIPTION OF EMBODIMENT(S) OF THE INVENTION

Figure 1A:
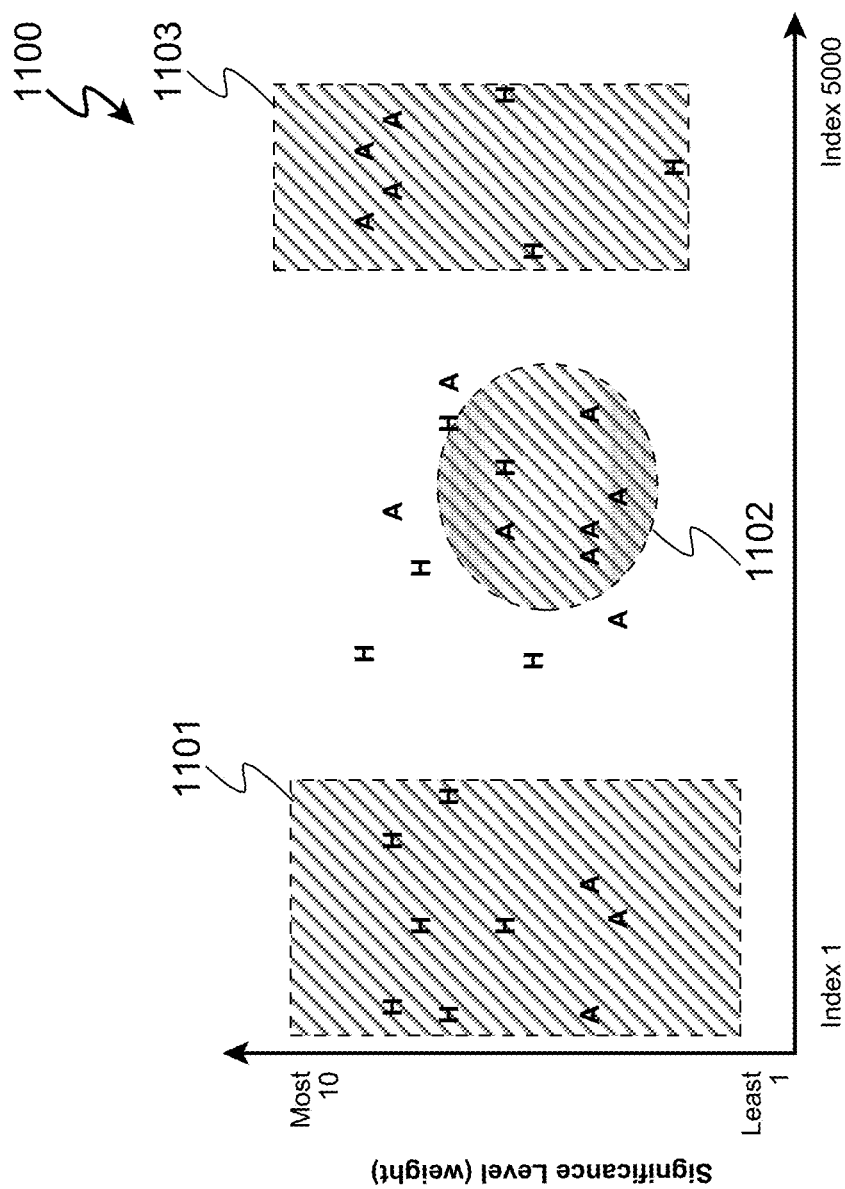
FIGS. 1a and 1b illustrate in a black-and-white format the visualization output of a process or system according to the present invention.

Most consumers of literature have a preference of the type and format of books they read, enjoy and find most useful.

These preferences are usually reflected in certain characteristics that are common among all of their preferred works of literature, and the flows of content within each of these are usually highly similar to each other.

For example, how funny and what types of humor used in a work of literature can be one key category of literary element that a particular person prefers. Other consumers may prefer a mixture of adventure and suspense, or they may prefer adventure with exploration, rather than adventure with action. In some circles, the broad adventure genre would not be enough to determine whether someone would like a book.

Literary Terminology

Terminology used in analysis and criticism of works of literature can be challenging to define in a precise manner. Many commonly used terms are subject to debate by scholars in this field, such as the precise meaning of "plot" or "character". Kathleen Morner and Ralph Rausch have stated in the forward of the NTC's Dictionary of Literary Terms (1998, McGraw-Hill) that such an effort to ascertain the exact meaning of a literary term can be a "vicious circle", wherein terms can be defined with respect to each other. Thus, literary terminology is context-dependent to a significant degree. The terminology used in the present disclosure will be used in a manner consistent with automated analysis of works of text, and in a manner which lends itself to computer and software design.

Deep Semantic Analysis of Natural Language Text in General

For the purposes of the present disclosure, the term "deep semantic" relationships, is meant to refer to relationships between information entities in a given context and how they relate to each other. They can be the occurrence of triple store terms or entities or they can be the occurrence with a relationship of those entities. For example, (Mutation, Cancer, Organ) would be a semantic relationship, identifying that mutations, cancer and specific organ ontologies have a deep relationship. Further, a deep semantic analysis system sometimes associates a specific relationship (mass, ?indicates, metastasis), where the combination and synonyms for "indicates" would mean the cancer has metastasized.

The term deep semantic relationship may also refer to the relationship of terms in a specific ontology and their similarity when expressed in passages of text based on the how they are typically expressed using sequence matching algorithms for text analysis. For example, the well-known Smith-Waterman sequence-matching algorithm measures the lengths of the longest similar subsequence between two texts, which is then a measured or detected semantic relationship between those texts.

Deep semantic relationships consider the meaning of words within the context and structure of a sentence. They signify a "deep" understanding the meaning of words that comprise a relationship within the sentence. Deep semantic relationships are usually developed with a very specific use case in mind. For example, consider the sentence "John bought bread at the store." From this, a relationship like sold(store, bread) may be mined, indicating that the store sold bread. This relationship requires a deep understanding of what a store is (a retailer that sells consumable goods) and that bread is one of those items.

For example, one "specific use" in which deep semantic analysis has been proposed is the deep semantic interpretations of legal texts as proposed by L. Thorne McCarty of Rutgers University (Association of Computer Machinery (ACM), 971-1-59593-680). Another useful publicly-available document regarding realization of a general purpose automatic deep semantic analyzer of natural language text is described in "Deep Semantic Analysis of Text" by James F. Allen, et al., of the University of Rochester and the Institute for Human and Machine Cognition (document W08-0227 from the ACL).

So, while deep semantic analysis of natural language text in general has been discussed in the public domain, the inventors have discovered the unsatisfied problem set forth herein. One approach to advancing beyond keyword searching is "intent-centric" processing as proposed by Scott Brave, et al., in WIPO patent application WO 2009/021198 A1. Inventors do not believe this approach, however solves the presently addressed problem, as will be evident by the following paragraphs.

The present invention is set forth in at least one exemplary embodiment as an application of or manner of using a deep semantic analyzer platform. This platform may be a system such as the IBM Watson™ system, such as is described in "Building Watson: An Overview of the DeepQA Project" (Stanford University online, and AI Magazine, Fall 2010 issue). The foundation deep semantic analysis platform may be an alternate general-purpose deep semantic analyzer implementation such as the semantic extraction component of the system described by Anna Stavrianou in United States Pre-Grant Published Patent Application 2013/0218914 A1 (Aug. 22, 2013) suitably modified to include the functionality of the related, incorporated patent application and that described herein by the present inventors. Other useful, publicly-available teachings regarding the availability of general purpose deep semantic analyzers which may be suitable for adapting and improving to the present invention may include those described by Konstantin Zuev in United States Pre-Grant Published Patent Application 2011/0270607 A1 (Nov. 3, 2011); the Thompson's Motif-Index Literature system of Thiery Declerk, et al., as published in "Research and Advanced Technology for Digital Libraries: Lecture Notes in Computer Science", vol. 6966, 2011, pp. 151-158; and using natural language parsers such as that described by Sala Ait-Mokhtar, et al., in U.S. Pat. No. 7,058,567 (Jun. 6, 2006).

One may contrast deep semantic relationships with shallow semantic relationships, that latter of which usually only consider the structure of parts of speech within a sentence, and not necessarily the meanings of those words. An example shallow relationship may simply be of the form sentence(subject, verb, object). In the above example, this would be sentence(john, bought, bread). These terms don't signify any special meaning, but their parts of speech form a shallow relationship called "sentence".

Graphical logical forms for representation of text can be created using one of several known methods, such as that proposed by James F. Allen, Mary Swift, and Will de Beaumont, of the University of Rochester and the Institute for Human and Machine Cognition (Association for Computer Linguistics (ACL), anthology document W08-2227).

Review of the Available Technologies

A very common means for recommending a book or work of literature to a potential consumer is by comparing buying habits of other consumers. For example, an online bookstore may recommend several additional books after a consumer has put a first book in an electronic shopping cart, along with a notation such as "other customers also purchased X, Y and Z books when they purchased this book." The effectiveness of this scheme depends entirely upon whether or not the other purchasers had similar likes and dislikes to the current user of the online bookstore website, of course.

More sophisticated are "book recommendation engines", which attempt to make a better estimate at recommending other books beyond just reporting buying trends. Current book recommendation engines are simple, however, as they do not include deep analysis of a user's past book interests and the book content and correlate those information to find a reasonable match for that user based on the deep literary elements across several books or literature.

For example, one available technology is described in U.S. Pat. No. 6,0649,980 to Jacobi, which uses a conventional rating system to identify books that readers are likely to like. This fails to consider the many nuances of literature to power the recommendation engine, if we understand this disclosure correctly.

Another example is pre-grant published U.S. Pre-Grant Published Patent Application 2007/0292826 A1 to Goddy, which attempts to pair books to potential consumers based on the reader's comprehensive capacity and interests. It does not consider the semantic fingerprint of literature in pairing books with readers to the best of our understanding.

As a result, the present inventors have set about determining a number of system components which can be used individually to enhance certain aspects of literature consumption, and may also be used in combination with each other to yield new insights into works of literature. The present invention is one such componential invention, the others of which are subjects of related patent applications by the same inventors.

Overview of the Process of Present Invention

For the purposes of this disclosure, we will use the term "literary element" to refer to elements such as humor, mystery, drama, change of scenery or locale, romance, etc. According to this and related inventions, such literary elements are identified, quantified and qualified, such as by type (e.g. humor type: sarcasm, malapropism, pun, etc.) and by strength or weight.

A core idea of embodiments of the present invention is to utilize raw data indicating literary elements within a digital work of literature, their concentration clusters, and their relative weight (or significance) throughout a particular work of literature to find a similar matching patterns across another works of literature, and to be further used to determine similarity of content, or the make-up of key literary elements throughout the entire literary content. Such a tool may find utility in a number of applications, such as enhancing book recommendation engines by finding works of literature which have such deep similarities as a preferred work, and for evaluating potential marketability of a new work of literature by making deep comparisons to other works of literature and their market successes.

An advantage of embodiments according to the present invention is that digital works of literature can be analyzed independently without the intervention of the user indicating any information other than a set of two or more different literature, with an indication of which one they liked or have read. This makes it easy for publishers, users, or computer systems to take this information and give appropriate answers. One of these systems could be a book recommendation engine that takes core similarities across a particular set of literature as being something a user would like since they contain essentially the same literary element make-up and concentration and flow.

Another advantage of this system is that it can be used in evidence analysis across different experiments for the type of information expected and the similarity of the dialogue and content in experiments. For example, such an analysis tool could be used to search for and find other experiments with similar data sets with the same basic theme, or to find similar law cases which similar issues and certain desired outcomes (e.g. judgments, convictions, acquittals, etc.)

One key advantage here is just the fact that book recommendation is nowhere near as good to identify the key elements across several literature that a person may like. The type of content and their concentration and level typically changes how much a user likes a particular book. With this technology, a system can much closer match a book not just based on arbitrary ratings, or general genre, but according also to deep characteristics, patterns, flow and development of literary elements based on the actual content of a book.

Current Invention's Utility in a Larger Architecture

Figure 4:
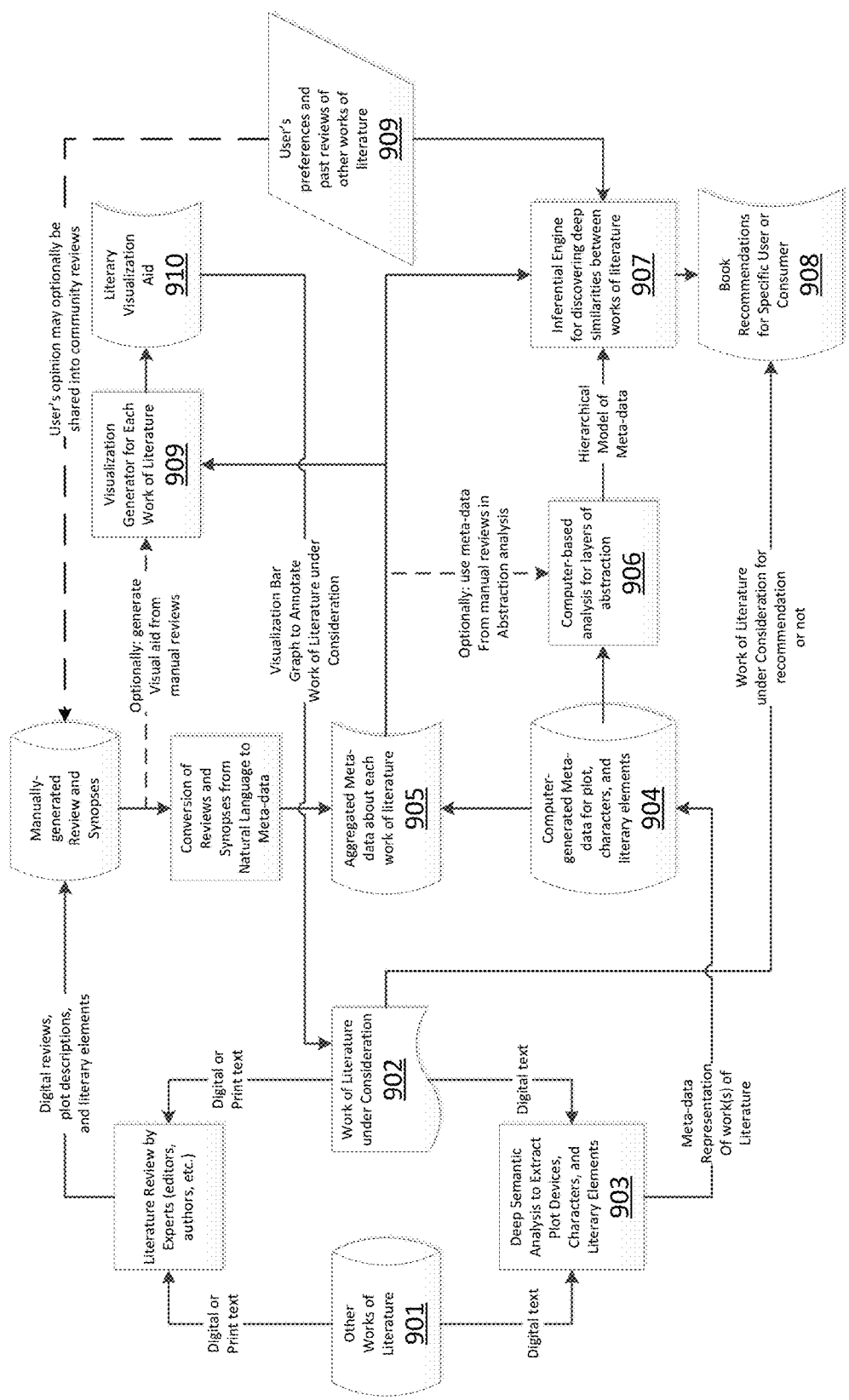
FIG. 4 depicts an arrangement of components and functions in which embodiments of the present invention will find utility.

The invention disclosed herein and several related inventions, also disclosed in U.S. patent applications by the same inventors, optionally fit within a larger architecture for literature analysis, recommendation and annotation. Turning to FIG. 4, such an arrangement of components and elements is shown. A work of literature under consideration (902) and optionally one or more other works of literature (901) may be subjected to deep semantic analysis to extract characters, their relationships to each other and plot events, as well as other literary elements such as elements (and significance or intensity) of humor, mystery, drama, scenery, etc. One such automated deep semantic analysis process is described in a related patent application by the present inventors.

Meta-data representing the results of this analysis is stored (904), and optionally aggregated (905) with meta-data which is converted from manually-created descriptions of the works of literature, such as reviews, Cliff™ notes, condensed versions of the works, etc.

In one manner of using this meta-data, which is disclosed in another related patent application, the meta-data may be further analyzed and organized (906) into hierarchical layers of abstraction to allow ready comparison with other works of literature via their abstracted meta-data representations.

In another manner of using this meta-data (904) which is disclosed in another related patent application, the computer-generated meta-data, or the meta-data converted from manually-generated reviews, or a combination (905) of both, is analyzed to generate (909) a visualization of the work of literature (910) which relates segments of the literature to plot events and intensity or significance of the literary elements (humor, mystery, scenery, etc.). This visualization (910) may then be used to annotate the work of literature (902) that it represents, such as printing it on the back cover of the paper book or displaying it relative to the digital book on a web page.

The present invention involves another use of this meta-data, and optionally uses the abstracted modeling process (disclosed in another related patent application). According to embodiments of the present invention, the meta-data and models may be used by an inferential engine (907) to discover deep similarities between two or more works of literature, and to yield one or more recommendations (908) to a potential consumer. The potential consumer's preferences may also optionally be factored into the inferential engine's analysis, as is disclosed in the related patent application.

Details of Processes According to the Present Invention

Utilizing data gathered from finding literary elements and their importance (weight) in literature, processes according to the present invention will provide data points for a particular work of literature. This meta-data may be machine-generated, as disclosed in FIG. 4 and in related patent applications, or it may be manually created, or a combination of the two may be ingested by processes according to the present invention. These provide the data set to be used.

The processes then perform one or more cluster analyses on the data to discover one or both of the following: (1) Similarity in Concepts within portions of the work of literature, and (2) Consistency Trends throughout the work of literature. Either or both of these characteristics can be essential to finding a new work of literature to match a consumer's preferences. The former indicates localized or temporary characteristics, such as characteristics which occur within the confines of a segment or chapter of the work of literature. For example, in a reference book, a Similarity in Concept would be having each chapter focused tightly on a particular subject area, with little or none of that subject area appearing in other chapters or segments of the book. The latter indicates an overall plot development or flow of a literary element through the entirety of the work of literature, such as humor and drama ebbing and flowing in each of the chapters in the book. One might consider these to be temporal and longitudinal characteristics, respectively.

Figure 1B:
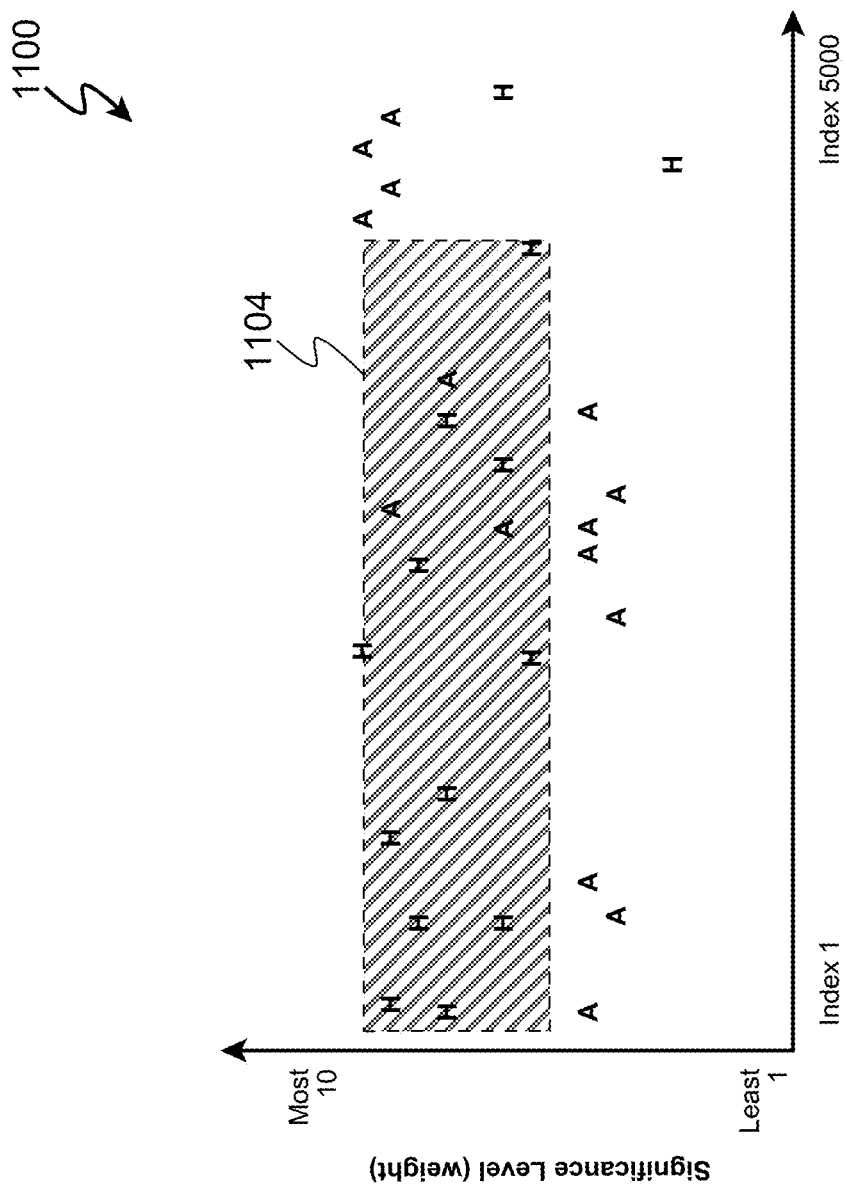

For example, these two aspects resulting of this analytical process can be plotted into a two-axis graph (1100) as shown in FIGS. 1a and 1b. In both Figures, the horizontal axis corresponds to progress from the beginning of the work of literature to the ending of the work of literature, such as from the first page to the last page. In a more abstract indicia, we show this progressing from Index=1 to Index=5000. The vertical axis corresponds to the significance or weight of a particular event or literary element as it appears at a particular point (index value, page number, etc.) in the work of literature, wherein the scale is normalized ranging from a least significant to a most significant. Further, in this graph, two types of literary elements are shown, humor elements as shown with a letter "H" and adventure elements as shown with a letter A. For example, near the beginning of this example book (e.g. near index=1), there is an adventure element shown as the "A" at about the vertical coordinate of 3 (moderately insignificant). And, slightly afterwards, there are two humor elements as shown by "H's", one being moderately significant (near the vertical coordinate of 6) and the other being more significant (near the vertical coordinate of 8).

Progressing from left to right in FIG. 1a, one can see the various humor (H) and adventure (A) elements as they occur within the timeline of the work of literature, as well as each of their relative significances on a normalized scale of 1-10.

The analytical processes receive this data, preferably in the form of a list of annotated data points, such as category (instance_count, index_number, significance_value), which may appear in text as such:

adventure(1, 12, 4); adventure(2, 103, 3); adventure(3, 144, 4);
... humor(1, 20, 7); humor(2, 44, 8); ....

In practice, many more literary element categories, such as drama, travel, love, etc., may be included in the list, and the list does not have to be sorted into instance order as shown here, of course.

At this point, it may be useful to clarify what a cluster is considered to be in the context of the present invention. Typically, a cluster will be less than an entire book and even less than an entire chapter, for example, a group of humor events within a chapter of a multi-chapter book. However, in some works of literature, certain elements may appear rather consistently throughout the entire work or throughout an entire chapter, as in such a situation, the cluster may extend to these limits. However, as will be described in the following paragraphs regarding a recommendation engines, such far-reaching clusters may not factor heavily in the selection of works of literature to recommend because they will not provide a pattern that differentiates in favor of or against recommendation.

In the first analysis, a process according to the present invention may look for temporal clusters, such as a first cluster (1101) which includes all of the events in the first quarter of the work of literature (e.g. index value ranging from 1 to 1250), and a second cluster (1102) in the middle portion of the book, and a third cluster (1103) in the latter portion of the book. Some of these clusters may have widely varying significance levels (1101, 1103), or may be restricted to less variance in significance levels (1102). Such clusters represent Similarities in Concepts for a segment, such as a chapter, and once determined, can be used to search for other works of literature having similarly clustered concepts.

For example, when considering a science reference book, the first cluster (1101) may show a concentration of shallow as well as deep information about a particular subject in the first 2 or 3 chapters, but the rest of the chapters may be relatively devoid of those subjects, which might be a preferred arrangement of information for a particular reader. The second cluster (1102) may show that within those chapters, the level of detail in the information presented is fairly consistent, and is neither introductory in nature nor requiring of great expertise to understand.

If this graph were representing an analyzed novel, the third cluster (1103) indicated that it finishes with a lot of adventure (A's in the high significance range), and a little bit of humor (H's in the lower significance range) in the final segments, scenes or chapters. This may be a pattern that a user prefers or one that the user wishes to avoid, and can be factored into comparisons with other works of literature for potential recommendations.

Another example, of a Similarity Concept where the variance of significance is limited and the type or concentration of the literary elements include two or more literary elements could be depicted as a group of humorous elements tied to sarcasm and puns, along side detailed imagery about food elements, and exploration elements. These clusters and their occurrences throughout the literary works can be compared for favorable patterns for a user.

Now referring to FIG. 1b, in which the same pattern of literary instances (H's and A's) is shown, the results of the second analysis for longitudinal patterns, or Consistency Trends, is show as a fourth cluster (1104). Such a cluster is found by allowing a greater deviation along the horizontal axis to look for clusters which run throughout the majority of the length of the book or a segment of the book. But, to look for consistency, generally the cluster analysis would be constrained to less deviation in the horizontal axis, thereby searching for a consistent level of each literary element (e.g. moderate humor throughout or intense drama throughout).

As such, by using clustering analysis processes with varying amounts of allowed deviation in the index value and the significance value, the system can find clusters of both types. These clusters can be saved to a digital file for subsequent use by other systems and components, and may be plotted to a visual graph for interpretation and use by a human reader.

For example, the previously-provided example meta-data list can be further annotated to include cluster parameters of Similarity Concepts and Consistency Trends such as category(instance_count, index_number, significance_value, SC#, SC#, . . . CT#, CT#, . . . ), to allow for each instance to belong to more than one cluster, which may appear in text as such:

adventure(1, 12, 4, SC1101);
adventure(2, 103, 3, SC1101);
adventure(3, 144, 4, SC1101);
. . .
humor(1, 20, 7, SC1101, CT1104);
humor(2, 44, 8, SC1101, CT1104);

These analytical results will plot the meta-data and clusters of data points across a particular theme, genre, and we can keep those data points over a segment of a text within literature.

For example, a cluster trend may be a high significance of level 8 of fear for more than 40% of a segment of the literature, where a segment may be a chapter, and where these thresholds may be adjusted by a user or administrator. This consistency trend may be repeated throughout the book will signify a pattern which can be used for comparison. Even one of these trends suffice for favorable comparison if the significance level of the trend is high enough for, or low enough for dislike comparisons.

Further, a cluster trend is not limited to one particular literary element showing consistency but a consistency of two or more literary elements over a particular segment would denote a multi-element consistency trend. For example, humor and adventure within a small variance of significance level (example, 8 and 7 respectively) for a 25% duration of a segment would be denoted as a consistency trend.

Identifying Similarity Concepts

The segment of data for the clusters can be adjusted and specified as the system learns about the correlation of the certain literary elements and the frequency of other elements within that scope (i.e., within a specific range or segment length). The system may also use a simple heuristic model to give the length of the segment, such as 30 lines, 200 words, 3000 characters, etc.

Using an appropriate cluster method, or methods, the process will identify clusters based on a set of literary elements occurring within a specified range and keep track of the main cluster and their other relevant literary elements. For example, between text index 500 and 800 in the book, Humor existed 8 times, with a weight and importance of 7. This occurred during the adventure theme. This would be a cluster of data based on humor with attached relational data for adventure. If this pattern Humor existence with another theme suspense, with importance level 7 or 8, categories them together as a SC(Humor, Suspense)

The system may track of each of these Similarity Concept clusters and find similar concept clusters within a specified threshold that match throughout the books. Each literary element may have a different specified segment length and cluster occurrence threshold. Although implicitly the overall weight of a Literary Element is significantly affected by the relationship data it contains (e.g. Main character), when performing Similarity Concept matching for the purpose of generating a recommendation, a secondary pass through the literary element clusters may analyze the relationship data of those literary elements, and may determine whether they match across the two digital works being compared.

Identifying Consistency Trends

The consistency trend process takes each particular literary element instance and looks at the data points as it moves across segments and keeps a relatively consistent weight, throughout the segment of text. It may also group literary elements which appear together or otherwise correlate well to each other.

The frequency and length of these consistent literary elements identifies a pattern, which can be a CT(Humor) for a particular book. Matching of these trends for a configurable segment of text will determine a similarity value for two sets of literature.

The length of a consistency trend will be variable for each work of literature however within a threshold of length they would be considered relatively equal or the trends themselves will be considered the same once designated within their respective works of literature.

Concept Cluster Trends

In some cases the order in which literary elements and clusters exist, if the pattern repeats consistently, then that is a concept cluster trend and will be taken into consideration for similarity against two or more works of literature.

Example Logical Process for Cluster Finding

It will be appreciated by those skilled in the art that a wide variety of cluster finding processes and techniques may be employed by embodiments of the present invention. Various available cluster finding processes have different strengths and types of clusters which they find and identify, such as finding clusters including groups with small distances among the cluster members (tightly clustered), or finding dense areas of the data space (tightly coupled and highly populated), or finding clusters having certain intervals or particular statistical distributions (e.g. clusters with a normal distribution about a central point in the cluster). Clustering can be formulated as a multi-objective optimization process. Other terms often used to refer to cluster finding include automatic classification, numerical taxonomy, typological analysis, and botryology. The present invention does not attempt to improve upon or define yet another cluster finding process in general, but instead incorporates any suitable existing cluster finding process to achieve the analysis of deep literary elements and their significance and distribution throughout the length of a work of literature.

Figure 2:
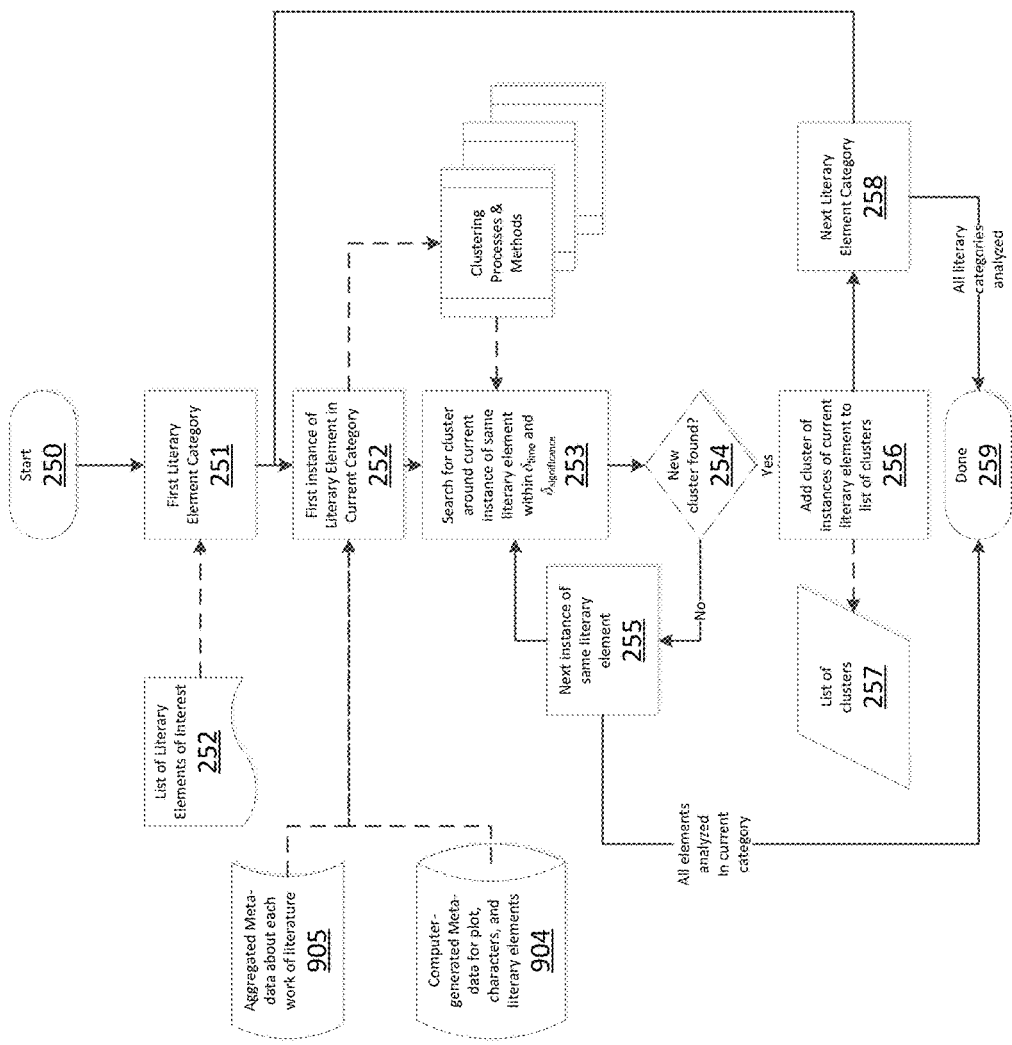
FIG. 2 sets forth a logical process according to the present invention.

Referring now to FIG. 2a, an example logical process according to the present invention is show, which starts (250) by considering a first literary category (251) from a list of literary categories (252), such as starting with humor from the list {humor, adventure, suspense, drama}.

Next, it searches the meta-data for a particular work of literature or the first instance of humor (252), and when it finds one, it invokes one or more clustering processes to determine if a cluster within a variation of time (or index value) $\delta_{time}$ and within a variation of significance value $\delta_{significance}$. By using different cluster finding control parameters for time $\delta_{time}$ and significance $\delta_{significance}$, this process is adaptable to finding both Concept Similarity clusters (e.g. greater ranges of significance, lesser ranges of time) as well as Consistency Trend clusters (e.g. less ranges of significance, greater ranges of time).

When a new cluster is found (254), it is added to the list of clusters (256, 257), and then the next instance (255) of the same literary category (humor for now) is found and analyzed for a surrounding cluster. This occurs until no more instances of the first literary category are left, at which time, the next literary element is selected (258) from the list (252), such as adventure in this example.

All instances of adventure are found in the meta-data, around which clusters are searched, and if found, are added to the list, as done for the first literary element category. This proceeds for the rest of the instances of the rest of the literary element categories, until all instances and all categories have been analyzed. The resulting list of clusters (257) now provides a cluster-based model of the work of literature, for both localized concepts and longitudinal trends.

Optionally, additionally passes through this process may be performed the list of literary elements and similarity clusters to find multi-literary Similarity Concepts that may match a variety of combinations from the literary element list. Literary elements which are determined to have a high degree of correlation to each other can be grouped into such as multi-literary-element Similarity Concept.

This information may now be plotted into a visual output, such as a display on a screen or a printed output for indicia on a book cover or a book review, similar to that shown in FIGS. 1a and 1b. It may also be rendered into a digital image file, such as a *.JPG or *.GIF file. And, this list of clusters may be output to an enhanced recommendation engine which would consider other concept and trend cluster models of other works of literature, compare them, find works with similar clusters and use those similarities in a recommendation calculation.

Recommendation Engine Using Cluster Analysis

Figure 5:
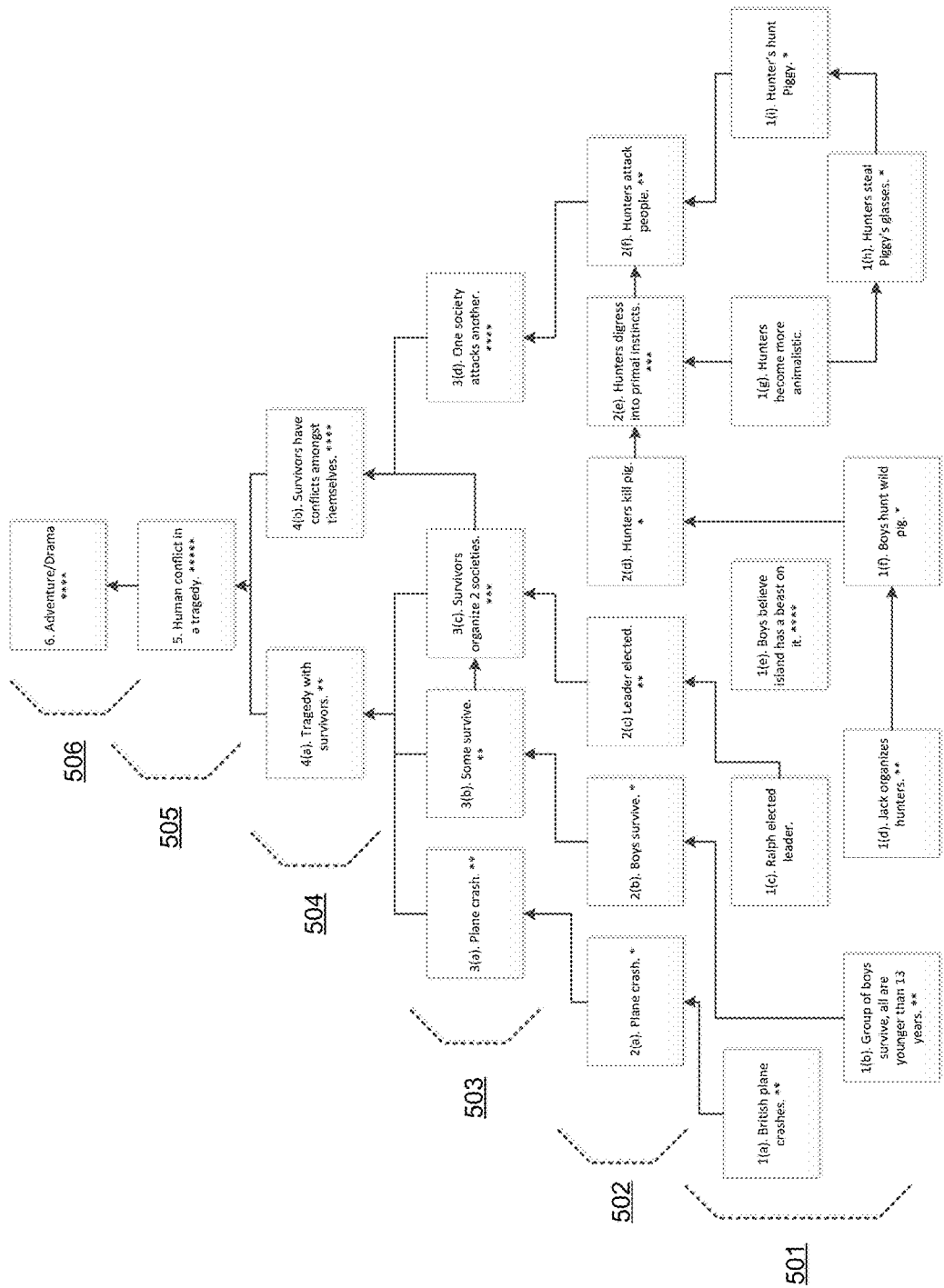
FIG. 5 provides an illustration of a multi-layer abstraction model, which can be encoded in a data structure suitable for use by an automated process to compare to other models of other literary works.
Figure 6:
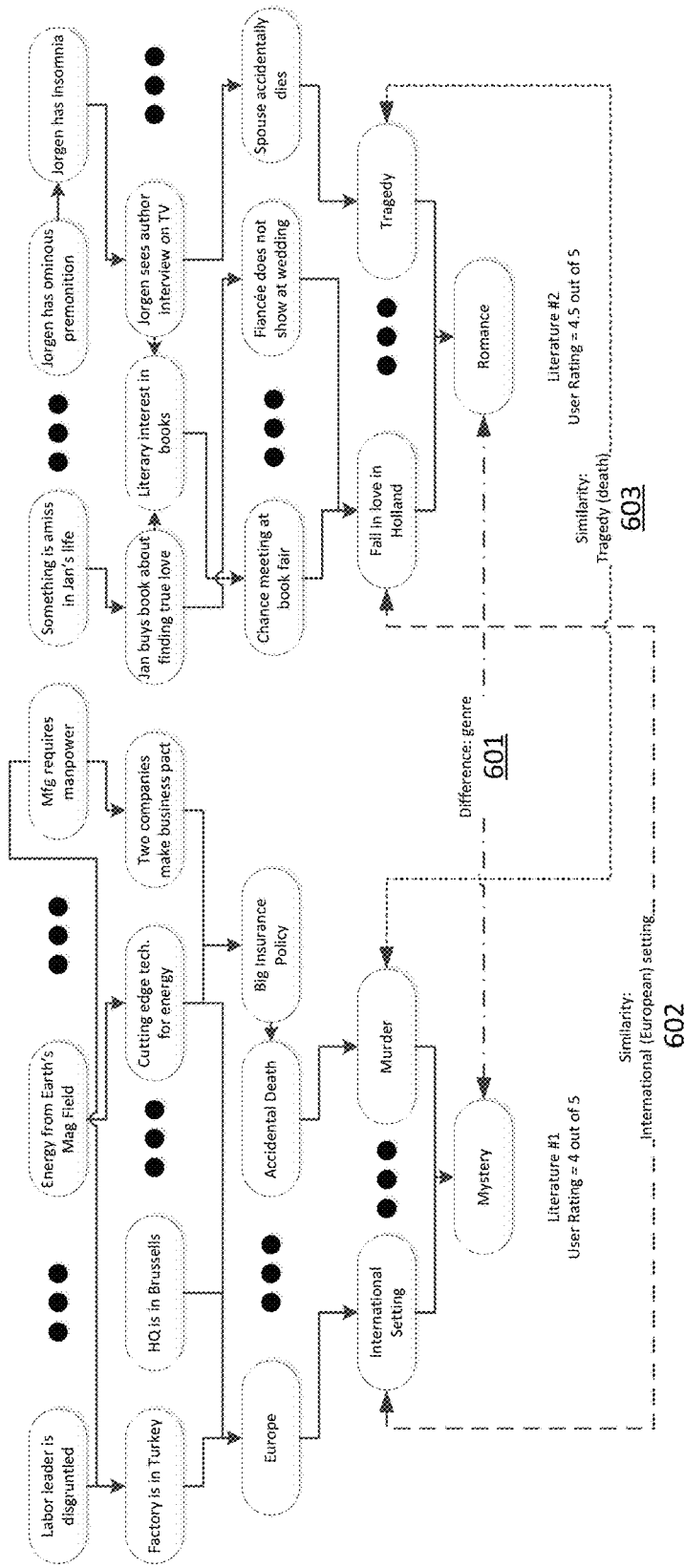
FIG. 6 depicts a comparison of two models of two different literary works as performed in at least one embodiment of the invention.

A logical process according to the present invention may receive the cluster analyses for each of a plurality of different works of literature, and may optionally receive the hierarchical layers of abstract model for each of the different works such as the models disclosed in the related patent application, and illustrated in FIGS. 5 and 6. We now briefly review those models, which may be created by any suitable means including the processes of the related patent disclosure.

Example of Abstraction Model of an Entire Novel.

Referring now turn to FIG. 5 which illustrates a semantic model of abstraction of an entire novel. This model representation shows multiple levels of abstraction (501, 502, 503, 504, 505, and 506) which lead to a root level (e.g. the greatest level of abstraction), such as a genre for a novel. Each item is denoted by a layer number N followed by an item ordinal letter (x) in the format of N(x), and a user rating is shown in stars (4 stars being a highly rated item, 1 star being a lowly rated item).

The relationship lines of FIG. 5 are provided to assist the reader in understanding how each item in each layer relates to or leads to one or more items in the next, more abstract layer. Those ordinarily skilled in the art will recognize that the results of semantic analysis are not always two dimensional or planar as shown here, but the illustration is useful for understanding the relationships between items and layers.

In at least one embodiment of the present invention, each item of the multi-layer abstraction model can be represented by a set of attributes as follows, which is conducive to representation in database records, for example:

[<user_rating>-<node>-<level>]

where <user_rating> is a representation of the user's rating (e.g. number of stars, etc.), <node> is the item identifier within a layer (e.g. the ordinal letter of FIG. 5), and <level> is the abstraction layer (e.g. could be absolute such as 1, 2, 3, 4, etc., or relative such as +1, +2, +3, etc.).

Such a notation system can also be captured in an XML-like structure, such as:

```
<literary_work_model>
  <abstraction_model_item>
    <description>string</description>
    <user_rating>****</user_rating>
```

```
    <node>x</node>
    <level>N</level>
  </abstraction_model_item>
  . . .
</literary_work_model>
```

In such an XML model, the third level (503) of abstraction of the model shown in FIG. 5 would be captured as follows:

```
<literary_work_model>
  <abstraction_model_item>
    <level>3</level>
    <node>a</node>
    <description>"plane crash"</description>
    <user_rating>**</user_rating>
  </abstraction_model_item>
  <abstraction_model_item>
    <level>3</level>
    <node>b</node>
    <description>"some survive"</description>
    <user_rating>**</user_rating>
  </abstraction_model_item>
  <abstraction_model_item>
    <level>3</level>
    <node>c</node>
    <description>"survivors organized into 2
societies"</description>
    <user_rating>***</user_rating>
  </abstraction_model_item>
  <abstraction_model_item>
    <level>3</level>
    <node>d</node>
    <description>"one society attacks anohter"</description>
    <user_rating>****</user_rating>
  </abstraction_model_item>
</literary_work_model>
```

In such a data structure representing the results of the deep semantic analysis of a literary work, the processes according to the present invention are enabled to compare models of different literary works, and to detect similarities between various levels and items within levels to determine alternative literary works which may be of interest to the user based on the user's prior ratings and prior consumption of literary works.

Pseudo-Code Process to Generate a Multi-Layer Abstraction Model of a Work of Literature.

The following pseudo-code process is provided to the reader for a high-level example of at least one embodiment of a logical process:

1. System ingests the electronic literature in its entirety, optionally in part.
2. System runs a series of annotators to extract semantic relationships from text.
   a. Both deep and shallow semantic relations are detected.
   b. Deep semantic relationship captures atomic event of interest, such as "Ralph blows the conch".
3. The system repeats semantic analysis on the annotations made in the previous iteration.
   a. For consistency, the annotations may be translated to plain-text for consistent processing.
   b. Each iteration of semantic analysis becomes more generalized, thereby encompassing a broader set of annotations.
4. The process repeats until no further generalization is possible (e.g. the literature's genre is reached).
5. Methods to detect pertinent information/annotations may be employed.

Comparison of Abstraction Models.

Referring now to FIG. 6, two abstraction models for two different literary works are graphically compared. As those skilled in the art will recognize, this graphical depiction is for the reader's understanding, but in practice, such a model can be represented in a construct of database records without such a graphical representation but in a manner which is machine readable and machine useable. Both models represent literary works which are highly rated overall by a user. On the left, a model for a hypothetical mystery is shown, and on the right, a hypothetical model for a romance novel is shown. One can see that there is a difference (401) in the genre, so based on just analyzing these two models, it is inconclusive whether the user prefers or not mysteries or romance. However, a bit of a pattern emerges through the similarities of an international setting (possibly even more specifically a European setting), and the similarity of a tragedy (possibly even more specifically an untimely death).

Extending on this analysis and comparison, the more works that are added to the analysis with a greater range of user ratings (strong like to strong dislike), the greater the precision of common elements can be inferred. If, for example, after considering twenty rated literary pieces it is found that of thirteen which are highly rated, nine of them are set in Europe, then a strong preference for literary works set in Europe can be inferred. And, if only three of the highly-rated works involve tragedy and untimely death, then a weak to neutral preference for this plot element can be inferred. If, out of the twenty considered only four are lowly-rated and three of those deal with political themes, then a weak dislike can be inferred from that pattern.

These comparisons, whether they are rendered to a graphical state or not, are useful in the enhanced recommendation engine which incorporates the cluster analysis as described in the following paragraphs. As such, the user ratings, inferred user preferences and dislikes, and explicit user preferences and dislikes (909 in FIG. 4) can be combined and coalesced with the clusters found in multiple different works of literature to drive an enhanced recommendation engine as described next.

Enhanced Recommendation Engine.

The present inventors recognized a number of shortcomings and unsolved problems with existing literature recommendation engines as previously described. The inventors recognized that existing literary recommendation engines use fairly high-level sentiment analysis. For example, users who starred" or gave "thumbs up" to book A also enjoyed books B and C, and/or users who purchased book D also often (statistically) purchased books E and F. A recommendation engine of the presently-available art, without the enhancements disclosed herein, would recommend a reader who liked book B to possibly buy or read books A and C, and likewise, would cross-recommend books D, E and F. Such a sentiment-based data set is scaled based on the user's overall impression of the entire literary work, and therefore does not address the question: "What specifically did the user like and/or not like about this piece literature?" For example, a user may have liked book A because it had a sort of humor that the user prefers, but would not actually like books B or C because, although they are from the same genre and often were liked by the same users, do not contain this type of humor.

Currently-available recommendation systems, therefore, are dealing with inferior data sets for analysis and require much greater volumes of data to tease out these specifics through process of elimination, as the present inventors have realized. Beyond the users' overall impressions of a literary piece, the present inventors realize that users have much deeper, discrete opinions on various sub-components of a story, threads of tone/temper throughout the piece, and even stanzas of collective elements that work well together.

Leveraging this level of user sentiment allows intelligent systems to identify other literary works embodying these characteristics with far greater precision. Knowing exactly which elements and cross-sections of a piece a user liked/disliked, allows us to infer a far richer set of sentiment patterns we can use to more accurately surface recommendations with a far greater level of confidence. The previously-described cluster analysis provides deeper insights such as this.

The present inventors set out to create a process which would, beyond creation of the visualization of the cluster analysis to allow for a user to quickly graphically understand the ebb-and-flow of various literary elements relative to plot devices and characters, but which would also allow for automated comparison and recommendation of other works of literature which the user is more likely to prefer (or not).

Methods according to the present invention leverage a user's feedback on discrete cross-sections of literary works to recommend literary works on a deeper level of sentiment analysis that match the user's favored literary style and elements. The matching method is based on rated literary plot elements of various level of details and the conjunction of rated literary elements throughout a particular literature.

An advantage of these enhanced recommendation processes is that they employ and consider a reader's sentiments at a granular level which leads to more favorable matches, e.g. just because "Lost' and "Gilligan's island' are both works of literature which are, at high levels of abstraction, based on people stranded on an island, doesn't mean a user will like both works of literature equally because one is a farcical comedy and the other is an adventure with intrigue and elements of horror. Methods according to the present invention will go deeper into the analysis, determining if the user prefers humor, adventure, horror, island geographies, struggles to be rescued, etc., so that recommendations are based upon these more granular aspects of the works of literature.

In one available embodiment, the following process is implemented by computer:

1. A library of digital literary works and deep user sentiment is ingested into a deep semantic analysis system;
2. A search is performed by the deep semantic analysis system on the digital literary works embodying similar literary elements rated favorably by a particular user and/or users of similar semantic sentiment;
3. Deep semantic analysis is performed using one or more analysis engines and confidence scoring agents to identify other literary works the user will likely enjoy;
4. Additionally, deep semantic user rating data may be aggregated from similar users to identify other literary works for a particular user with a greater level of confidence (e.g. instead of "users who purchased book A, also bought book B", the system will determine "users who similarly rated deep elements of book A, also enjoyed similar elements of book B" or "users who similarly enjoyed subset elements A1 of book A and subset B1 in book B, enjoyed similar combined elements in book C"); and
5. A large volume of data further enables the system to identify literary works embodying favored elements from multiple other works.

Another computer-based embodiment of a logical process according to the present invention may proceed as follows:

1. The system ingests a volume of digital literary works;
2. The system acquires user feedback on deep cross-section semantic elements of a literary work;
3. The system leverage the elements favored by a particular user, and it searches for other literary works embodying similar elements;
4. Candidate digital literary works for recommendation are processed and scored via a series of analysis engines to identify which candidates are recommended with the greatest confidence level; and
5. Deep semantic ratings from the user on other literary works as well as ratings from users with similar taste may be factored in to identify and score the candidate works with increasing levels of confidence.

Collection of user ratings on digital works of literature may occur in several different ways. One way to collect the user ratings is for the system to take the levels of abstraction data points and the sequential literary element data points and give the user an option to rate each of these data points in the context of the literature that they have read or while they are reading it. After the rating data for previously-read literature has been captured, the data can be used in a process such as those described in the preceding paragraphs.

Tiered and Grouped Rating System.

Figure 1C:
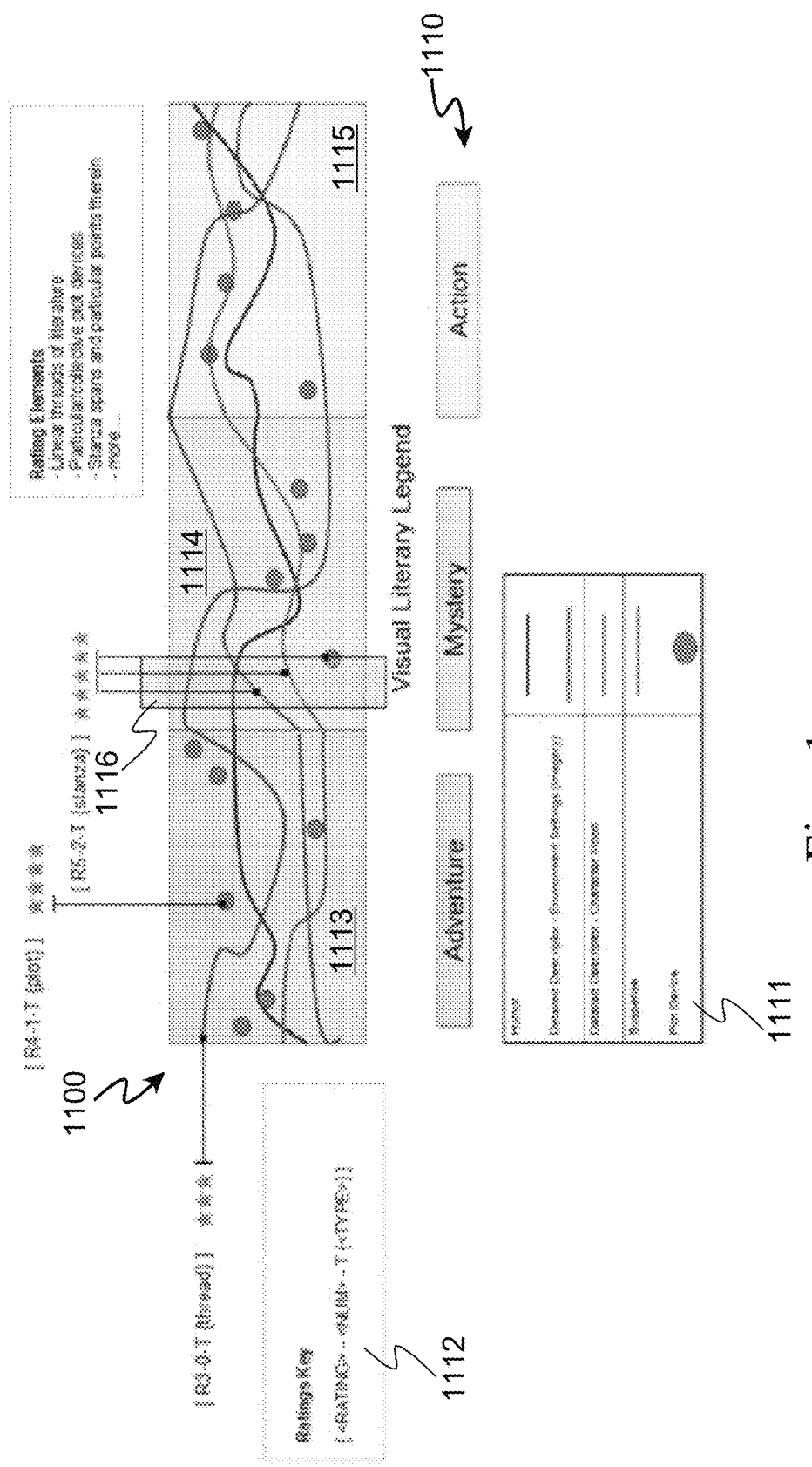
FIG. 1c provides a color representation of the visualization output which allows multiple sets of data about a work of literature to be displayed in a single image or graphic.

Another aspect of the present invention available in some embodiments is a literature rating system which uses a tiered and group approach, the results of which can be applied to the visualization, such as the example shown in FIG. 1c. This figure is presented in color, as it may be in such an embodiment, which allows multiple aspects of the results of the analysis of the literature to be shown in a single view, where different colors and transparent layers can be combined to show a user many different characteristics of the work of literature, and how those elements and trends relate to each other within the work of literature.

In this example enhanced visualization (1100), the work of literature begins on the left and progressed toward s the right for the end of the work of literature, just as in FIGS. 1a and 1b. Three dominant genres have been identified by the analysis of this work, which are keyed (1110) in grey for Adventure, light green for Mystery, and light yellow for Action. One can easily see how the work of literature progresses through these dominant genres (1113, 1114, and 1115), beginning with adventure, transitioning to mystery toward the middle of the work of literature, and ending with action, The significance of each literary element is displayed in color-coded (1111) line plots, such as a darker green line for imagery or scenery, or a purple line for character mood, etc. Plot devices and events are shown with a symbol, such as the orange-filled circles, appearing on the horizontal axis according to their occurrence in the timeline of the work of literature, and positioned vertically according to their significance level within the work of literature.

Of interest in this diagram, besides the color-based representations of different information sets, are the ratings indicators for various plot devices or plot events, as well as annotations for the literary element significance line plots, which take the form set forth in Table 1. This particular example_is based on the sequential plot element graph according to the tiered and group approach.

TABLE 1

| Example Ratings Indicia | |
|---|---|
| Rating | The rating the user gave this element. From 1 to 5, where 5 indicates liked that particular element or grouping. |
| Weight | The weight of the overall element, scaled from 1 to 10, indicating the level of impact that literary element had on that section or area of the literature. |
| Type | The type of the element. The type of element, examples, humor, plot devices, clusters (suspense with adventure), threads |

For example:

R4—Out of a best of 5, this feature has been rated 4.
W7—Weight is assigned a value of 7 for influence and impact on the literature (characters, main characters, overall weight for that particular)
T{plot}—A plot device, the weight being 7 means it moved the story along, a significant change, a mission accomplished, a decision to travel to an objective.

Another example:

R3—this literary element is rated a 3 out of 5 (stars).
W8—this literary element is assigned a significance weight of 8 out of 10 for level of detail.
T{Thread}—this literary element is a thread which includes descriptions of imagery and surroundings.

One embodiment of a process or method to make a comparison between two works of literature which are analyzed to augmented their sequential plots with literary element ratings indicia is as follows:

a. Identify the high rating thresholds of 3 or higher for the user book read;
b. Match the weight and type against other elements within the target book, and if the weight and type are similar and the weight is within a range of +/−1, then process a match;
c. throughout the work(s) of literature, match the ratings against the themes and the ratings of the given book, and when a theme and rating element match, increase preferable match score
d. For clusters, identify similar clusters with at least 60 percent of similar literary elements within the cluster, wherein the clusters can be located throughout the book, and wherein, as the number of occurrences of these cluster types increase based on the rating, the preferable match score is increased;
e. for certain highly rated literary element, adjust the preferable match score more such that the reoccurrence of highly rated features will increase the preferable match score; and
f. cumulatively track each scoring criteria for the preferable match score.

One embodiment of this method can use a 1-10 value range for each area, then if each area gets a cumulative score over 8, the book is recommended, score over 9 it is highly recommended, a cumulative score below 3 would be "not recommended", etc.

Suitable Computing Platform

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 3:
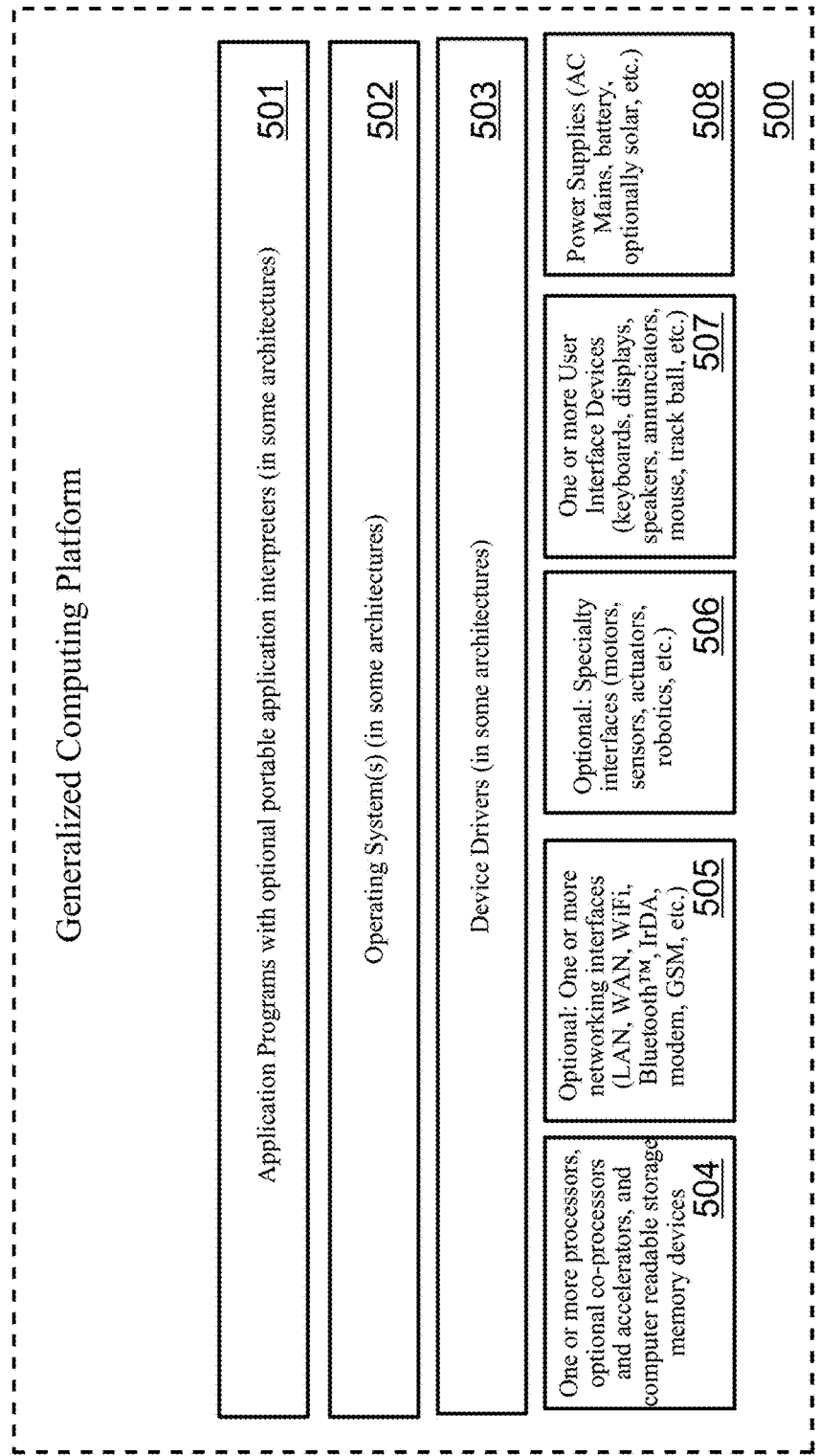
FIG. 3 illustrates a generalized computing platform suitable for combination with program instructions to perform a logical process such as shown in FIG. 3 to yield a computer system embodiment according to the present invention.

The present invention may be realized for many different processors used in many different computing platforms. FIG. 3 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, UNIX, LINUX, Google Android™, Apple iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for comparing and optionally recommending works of digital literature, comprising:
    performing, by a processor, deep semantic analysis to create at least a first digital heuristic model for at least a first work of digital literature, wherein the deep semantic analysis comprises machine learning by the computing platform, and wherein the heuristic model contains heuristics which are limited within a range of positional index values for one or more instances within one or more literary element categories;
    determining by a processor a degree of similarity between the first digital heuristic model for a first work of digital literature and a second digital heuristic model for a second work of digital literature; and
    producing, by a processor, via a user interface device a recommendation to a user regarding the degree of similarity;
    wherein the first and second heuristic digital models reflect limited lengths of segments within each first and second respective work of digital literature, respectively, within which similar abstracted concepts, or similar abstracted relationships, or both similar abstracted concepts and similar abstracted relationships are detected using natural language processing, wherein the concepts and relationships were abstracted from actual concepts and relationships in the respective works of digital literature by deep semantic analysis.

2. The method as set forth in claim 1 wherein the first heuristic model comprises at least one literary element for which a first user has indicated at least one interest or disinterest.

3. The method as set forth in claim 2 wherein the second heuristic model comprises a literary element for which the first user has indicated at least one interest or disinterest.

4. The method as set forth in claim 2 wherein the second heuristic model comprises at least one literary element for which a second user has indicated at least one interest or disinterest.

5. The method as set forth in claim 1 wherein the accessing of a first heuristic model further comprises:
    receiving by a processor meta-data modeling the first work of literature, the meta-data comprising one or more literary element categories, one or more instances within each literary element categories, and the positional index value and a significance value for each instance, wherein the significance value corresponds to a significance, weight or strength of an instance relative to other instances in the meta-data;

for each literary element category and for each instance within each literary element category of the first work of literature, invoking by a processor a heuristic finding process using a first control parameter limiting the range of index value variation and a second control parameter limiting the range of significance value variation in a found run length;

receiving by a processor from the heuristic finding process one or more heuristics found around one or more instances of one or more literary element categories; and storing by the processor the one or more heuristics into the first heuristic model for the first work of literature.

6. The method as set forth in claim 5 wherein the first control parameter limiting the range of index value variation is set to a run length value.

7. A computer program product for comparing and optionally recommending works of digital literature, comprising:
a tangible, computer readable memory storage device;
program instructions stored by the computer readable memory storage device for causing a processor to, when executed, perform steps of:
perform deep semantic analysis to create at least a first digital heuristic model for at least a first work of digital literature, wherein the deep semantic analysis comprises machine learning by the computing platform, and wherein the heuristic model contains heuristics which are limited within a range of positional index values for one or more instances within one or more literary element categories;
determine a degree of similarity between the first digital heuristic model for a first work of digital literature and a second digital heuristic model for a second work of digital literature; and
produce via a user interface device a recommendation to a user regarding the degree of similarity;
wherein the first and second digital heuristic models reflect limited lengths of segments within each first and second respective work of digital literature, respectively, within which similar abstracted concepts, or similar abstracted relationships, or both similar abstracted concepts and similar abstracted relationships are detected using natural language processing, wherein the concepts and relationships were abstracted from actual concepts and relationships in the respective works of digital literature by deep semantic analysis.

8. The computer program product as set forth in claim 7 wherein the first heuristic model comprises at least one literary element for which a first user has indicated at least one interest or disinterest.

9. The computer program product as set forth in claim 8 wherein the second heuristic model comprises at least one literary element for which the first user has indicated at least one interest or disinterest.

10. The computer program product as set forth in claim 8 wherein the second heuristic model comprises at least one literary element for which a second user has indicated at least one interest or disinterest.

11. The computer program product as set forth in claim 7 wherein the program instructions for accessing of a first heuristic model further comprise program instructions for, when executed, causing a processor to:

receive meta-data modeling the first work of literature, the meta-data comprising one or more literary element categories, one or more instances within each literary element categories, and the positional index value and a significance value for each instance, wherein the significance value corresponds to a significance, weight or strength of an instance relative to other instances in the meta-data;

for each literary element category and for each instance within each literary element category of the first work of literature, invoke a heuristic finding process using a first control parameter limiting the range of index value variation and a second control parameter limiting the range of significance value variation in a found run length;

receive from the heuristic finding process one or more heuristics found around one or more instances of one or more literary element categories; and store the one or more heuristics into the first heuristic model for the first work of literature.

12. The computer program product as set forth in claim 11 wherein the first control parameter limiting the range of index value variation is set to a run length value.

13. A system for comparing and optionally recommending works of digital literature, comprising:
a computer processor;
a tangible, computer readable memory storage device accessible by the computer processor;
program instructions stored by the computer readable memory storage device for causing the computer processor to, when executed, perform steps of:
perform deep semantic analysis to create at least a first digital heuristic model for at least a first work of digital literature, wherein the deep semantic analysis comprises machine learning by the computing platform, and wherein the heuristic model contains heuristics which are limited within a range of positional index values for one or more instances within one or more literary element categories;
determine a degree of similarity between the first digital heuristic model for a first work of digital literature and a second digital heuristic model for a second work of digital literature; and
produce via a user interface device a recommendation to a user regarding the degree of similarity;
wherein the first and second digital heuristic models reflect limited lengths of segments within each first and second respective work of digital literature, respectively, within which similar abstracted concepts, or similar abstracted relationships, or both similar abstracted concepts and similar abstracted relationships are detected using natural language processing, wherein the concepts and relationships were abstracted from actual concepts and relationships in the respective works of digital literature by deep semantic analysis.

14. The system as set forth in claim 13 wherein the first heuristic model comprises at least one literary element for which a first user has indicated at least one interest or disinterest.

15. The system as set forth in claim 14 wherein the second heuristic model comprises at least one literary element for which the first user has indicated at least one interest or disinterest.

16. The system as set forth in claim 14 wherein the second heuristic model comprises at least one literary element for which a second user has indicated at least one interest or disinterest.

17. The system as set forth in claim 13 wherein the program instructions for accessing of a first heuristic model further comprise program instructions for, when executed, causing the computer processor to:
- receive meta-data modeling the first work of literature, the meta-data comprising one or more literary element categories, one or more instances within each literary element categories, and the positional index value and significance value for each instance, wherein the significance value corresponds to a significance, weight or strength of an instance relative to other instances in the meta-data;
- for each literary element category and for each instance within each literary element category of the first work of literature, invoke a heuristic finding process using a first control parameter limiting the range of index value variation and a second control parameter limiting the range of significance value variation in a found run length;
- receive from the heuristic finding process one or more heuristics found around one or more instances of one or more literary element categories; and
- store the one or more heuristics into the first heuristic model for the first work of literature.

18. The system as set forth in claim 17 wherein the first control parameter limiting the range of index value variation is set to a run length value.

\* \* \* \* \*